(12) United States Patent  (10) Patent No.: US 8,171,453 B2
Meijer et al.  (45) Date of Patent: May 1, 2012

(54) EXPLICIT DELIMITATION OF SEMANTIC SCOPE

(75) Inventors: Henricus Johannes Maria Meijer, Mercer Island, WA (US); Amanda Silver, Seattle, WA (US); Paul A. Vick, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1146 days.

(21) Appl. No.: 11/751,503

(22) Filed: May 21, 2007

(65) Prior Publication Data

US 2008/0295083 A1 Nov. 27, 2008

(51) Int. Cl.
*G06F 9/44* (2006.01)
(52) U.S. Cl. ......................................................... 717/114
(58) Field of Classification Search .................. None
See application file for complete search history.

(56) References Cited

U.S. PATENT DOCUMENTS

| | | | | |
|---|---|---|---|---|
| 5,748,963 | A * | 5/1998 | Orr | 717/131 |
| 6,523,171 | B1 * | 2/2003 | Dupuy et al. | 717/136 |
| 6,678,745 | B1 | 1/2004 | Hodge | |
| 6,799,718 | B2 * | 10/2004 | Chan et al. | 235/375 |
| 7,003,420 | B2 | 2/2006 | Ur et al. | |
| 7,100,153 | B1 | 8/2006 | Ringseth et al. | |
| 7,200,842 | B1 * | 4/2007 | Susser et al. | 717/159 |
| 2003/0110472 | A1 * | 6/2003 | Alloing et al. | 717/122 |
| 2003/0131347 | A1 | 7/2003 | Allison | |
| 2003/0145308 | A1 * | 7/2003 | Geisinger | 717/114 |
| 2004/0015816 | A1 * | 1/2004 | Hines et al. | 717/101 |
| 2004/0181783 | A1 * | 9/2004 | Nagata et al. | 717/137 |
| 2004/0194058 | A1 * | 9/2004 | Meijer et al. | 717/116 |
| 2005/0044075 | A1 | 2/2005 | Steere et al. | |
| 2005/0055682 | A1 * | 3/2005 | Gadre et al. | 717/146 |
| 2006/0212845 | A1 * | 9/2006 | Davidson et al. | 717/113 |
| 2006/0212874 | A1 * | 9/2006 | Johnson et al. | 718/107 |
| 2006/0294494 | A1 | 12/2006 | Quinn et al. | |
| 2007/0022190 | A1 | 1/2007 | Brasegard et al. | |
| 2007/0050380 | A1 | 3/2007 | Meijer et al. | |
| 2007/0055978 | A1 | 3/2007 | Meijer et al. | |

OTHER PUBLICATIONS

Cook, "Obtuse, A Scripting Language for Migratory Applications", http://www.usenix.org/publications/library/proceedings/coots97/full_papers/cook/cook.pdf, Department of Computer and Information Science, University of Mississippi, last accessed Mar. 22, 2007, 15 pages.

Pautasso, et al., "Flexible Binding for Reusable Composition of Web Services", http://www.iks.inf.ethz.ch/publications/files/SC2005.pdf, Department of Computer Science, Swiss Federal Institute of Technology, Zurich Switzerland, last accessed Mar. 22, 2007, 16 pages.

* cited by examiner

*Primary Examiner* — Wei Zhen
*Assistant Examiner* — Adam R Banes
(74) *Attorney, Agent, or Firm* — Workman Nydegger

(57) ABSTRACT

Systems and methods are provided with respect to computer programming. Program behavior can be tuned to provide a seamless mixture of semantic behavior across a single program language syntax. Semantic behavior can be explicitly specified at arbitrary levels of syntactic granularity (e.g. expressions, members, types, compilation units . . . ), wherein semantic scope is commensurate with the specified level of granularity.

16 Claims, 12 Drawing Sheets

EXPLICIT DELIMITATION OF SEMANTIC SCOPE

BACKGROUND

Computer programs are groups of instructions that describe actions to be performed by a computer or other processor-based device. When a computer program is loaded and executed on computer hardware, the computer will behave in a predetermined manner by following the instructions of the computer program. Accordingly, the computer becomes a specialized machine that performs the tasks prescribed by the instructions.

A programmer using a programming language creates the instructions comprising a computer program. Typically, source code is specified or edited by a programmer manually and/or with help of an integrated development environment (IDE). Subsequently, the source code can be compiled or otherwise transformed by another program into computer instructions executable by a computer or like device.

A programming language is selected as a function many factors including language safety and expressiveness. Most languages can be classified based on their type system. A type system defines program behavior by how expressions, values and the like are classified into types and the interaction between types. Types afford constraints on interpretation of data in accordance with a language type system. Accordingly, types can be utilized to detect programming errors via a type checking system. In other words, a degree of program safety can be achieved by detecting meaningless or likely invalid code as a function of data types. Languages that employ such type constrains are typed languages (e.g., C, C#, VB, Java . . . ) while languages that do not are un-typed languages (e.g., assembly).

Typed languages can further be categorized based on when types are checked. Two categories of typed languages are statically typed and dynamically typed. A statically typed language enables a program to be type checked at compile time. Hence, all types should be known at compile time by explicit type specification or type inference, for example. Dynamically typed languages differ in that they are type checked at runtime. As a consequence, types need not be explicitly specified or inferable prior to use. Rather, they are determined during execution.

When selecting a language, programmers need to consider tradeoffs between static and dynamic typing. In particular, static typing is beneficial in that errors can be detected prior to execution and programs can execute very efficiently. Further, design time experience can be improved since assistance such as automatic fills and suggestions can be provided as a function of types. However, sometimes statically typed languages can be too restrictive. For example, a strict type system may not allow a programmer to make a desired method call. Dynamically typed languages allow more flexibility. In particular, they provide a means to bypass restrictions of a type system. Among other things, this allows a variable to take on types as a function of program execution. The disadvantage is significant in that any type errors associated with such a program will emerge at runtime.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

In brief, the subject disclosure pertains to a semantically tunable program language and associated mechanisms. Rather than requiring programmers to select a programming language for a project upfront as a function of supported semantics and anticipated requirements, a single language can be employed that supports multiple semantics that can be turned on/off during program design. Furthermore, the semantics can be specified at any level of syntactic granularity, for example by expression, statement, member, type and/or compilation unit. Accordingly, a single program can support a seamless mixture of different tunable behaviors at arbitrary levels of granularity thereby enabling programmers to specify domain specific semantics utilizing a single syntax.

In accordance with one aspect of the disclosure, a component is provided that can identify semantic scope associated with particular code. The semantic behavior or option can then be employed to ensure proper processing in accordance with the designated semantics. In one instance, this can be employed with respect to identifying early or late binding of types to object members and subsequent processing. However, a myriad of other semantics behaviors are also possible and contemplated.

According to yet another aspect of the disclosure, various mechanisms can be employed to explicitly delimit semantic scope. In one instance, this can be done syntactically via various tokens, symbols and/or keywords. Additionally or alternatively, scope can be specified and/or presented graphically utilizing syntax coloring and/or highlighting, among other things, so as to limit obfuscation of code.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods associated with a semantically tunable computer programming language are described hereinafter. A programming language is provided that can support a mixture of different semantic behavior within the same program. Furthermore, semantic behavior can be explicitly specified at arbitrary levels of syntactic granularity (e.g., expressions, members, types, compilation units . . . ). Accordingly, a program can be customized by explicit delimitation of semantic scope with respect to a single program language syntax.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
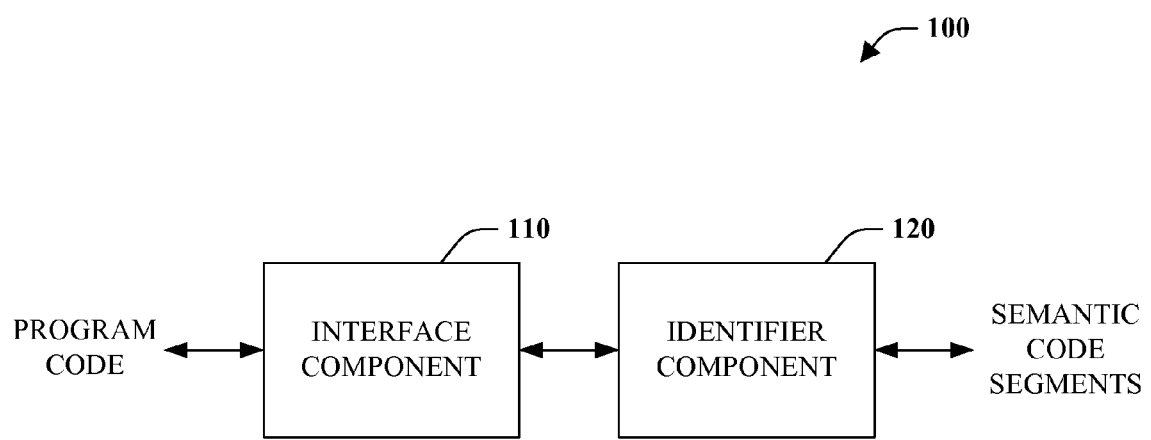
FIG. 1 is a block diagram of a computer program system in accordance with an aspect of the claimed subject matter.

Referring initially to FIG. 1, a computer program system 100 is depicted in accordance with an aspect of the claimed subject matter. Interface component 110 receives, retrieves or otherwise obtains or acquires computer program code. In one instance, the code can be source code associated with a high level programming language (e.g., C#, Visual Basic, Java . . . ) including specification of various semantic behaviors. More specifically, the code is semantically tuned or customized via explicit delimitation of semantic scope at various levels of granularity. The interface component 110 can provide or otherwise make such program code available to identifier component 120.

The identifier component 120 identifies or discovers semantic behavior associated with the code. Unlike conventional languages that define specific and fixed semantics for a language syntax, a programming language can support a mixture of explicitly specified semantics within a single program in accordance with an aspect of the subject disclosure. This enables programmers to delay specification or selection of semantics until the last moment in program development rather than upon selection of a specific programming language, for example. Moreover, semantics can be specified at arbitrary levels of syntactical granularity (e.g., expressions, statements, members, types, compilation units . . . ). Further, more than one type of semantic behavior can be specified for a region of code. The identifier component 120 facilitates identification of one or more semantic behaviors associated with particular regions to enable proper processing thereof.

Figure 2:
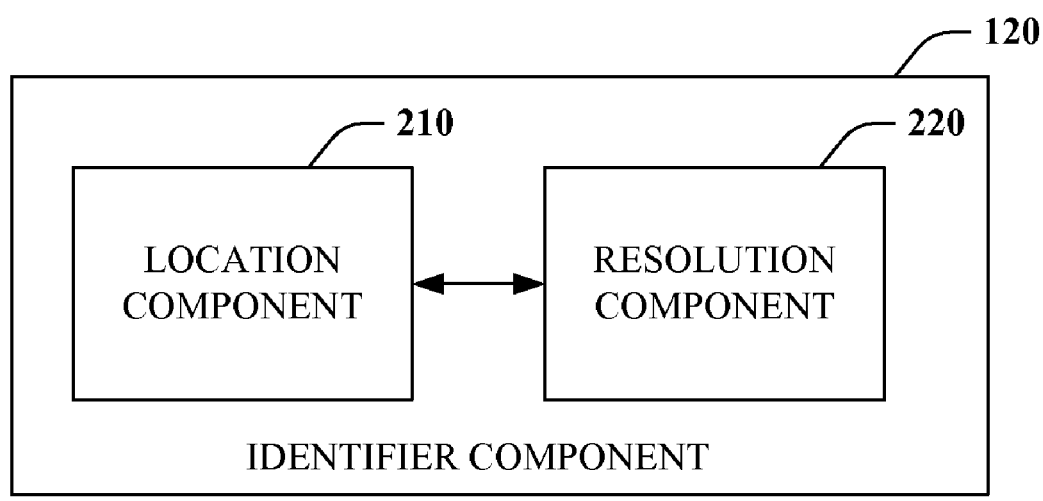
FIG. 2 is a block diagram of a representative identifier component.

Turning to FIG. 2, a representative identifier component 120 is illustrated in accordance with an aspect of the claimed subject matter. As shown, the identifier component 120 component includes a location component 210 and a resolution component 220.

The location component 210 is operable to identify regions of code associated with explicit semantics and a scope thereof. This can be accomplished by analyzing lexical syntactic mechanisms, tokens, keywords, custom attributes, annotations and/or other forms of eXtensible metadata. For example, the exclamation mark "!" or other syntax can be employed as an operator to identify and/or trigger late bound calls. Similarly, the dot operator "." can be utilized to trigger early or static binding of calls or vice versa. Accordingly, a method call "r.m" can indicate static binding of a type to "r," whereas "r!m" can denote late binding of a type at runtime. Further yet, scope can be delimited and thereby detected in a similar manner. For instance, "$( . . . )" or "$( . . . )$" can indicate that any code between the parentheses is to be associated with a particular semantic behavior.

It is to be appreciated that a plurality of semantic behaviors can be associated with a particular code region or a portion thereof. The resolution component 220 can aid identification of proper semantics in such instances. By way of example, where a code region includes embedded semantics a determination should be made to identify whether semantics override other semantics or supplement the semantics, among other things. The resolution component 220 can resolve these situations utilizing particular rules associated with semantics. In one instance, a hierarchy of semantics can be employed to facilitate identification of appropriate semantics.

Figure 3:
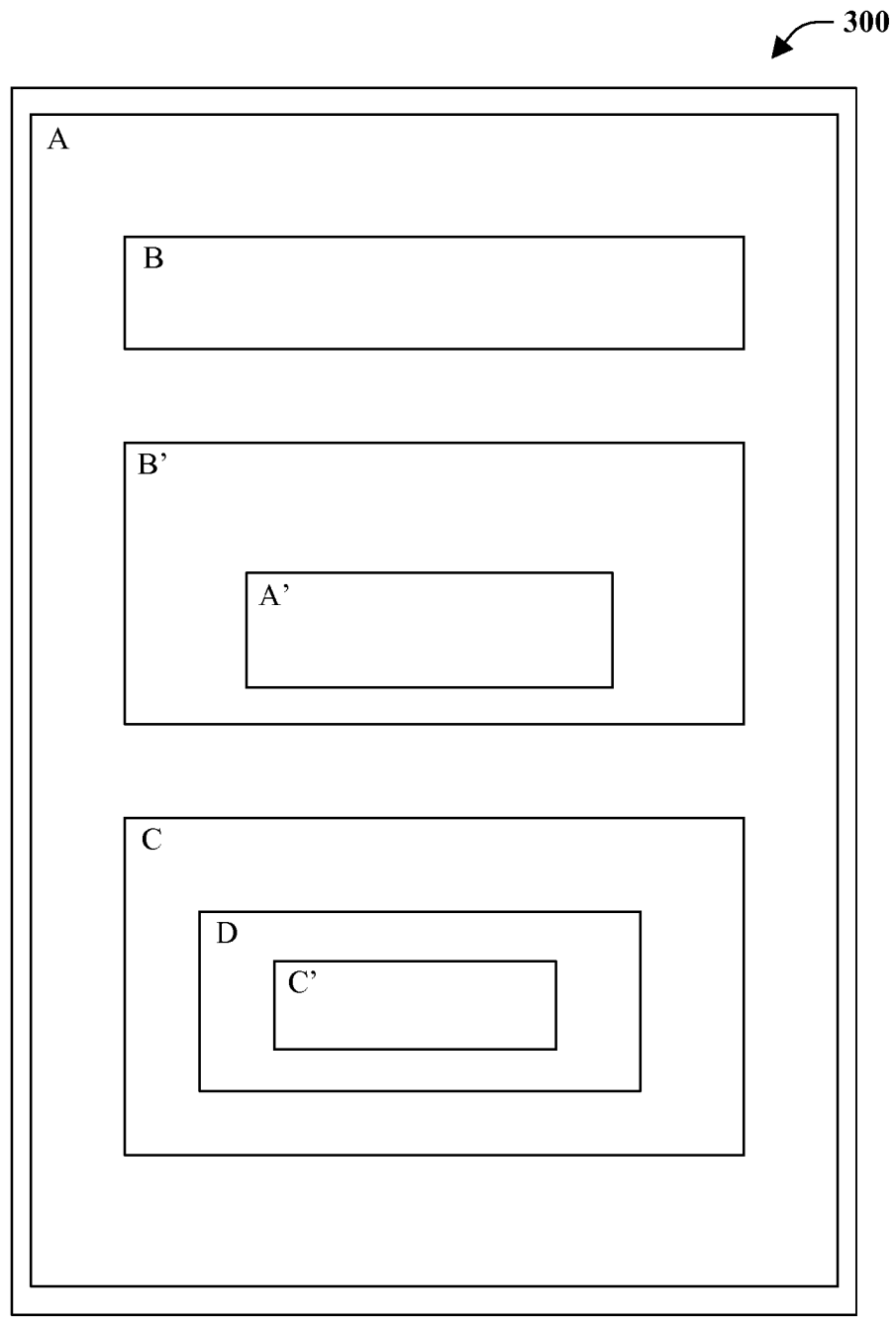
FIG. 3 is a graphical representative of a program including a plurality of semantic regions to facilitate clarity and understanding.

Turning to FIG. 3, an exemplary program 300 is illustrated including a plurality of delimited semantic scopes to facilitate clarity and understanding with respect to aspects of the disclosed subject matter. It is to be noted an appreciated that FIG. 3 and the following descriptive text identifies only a few of many different manners in which a program can be delimited with respect to semantic behavior. The example is provided solely to aid clarity and understanding not to limit the scope of the claimed subject matter.

The program 300 includes a number of unique semantic regions A-D defining explicitly specified semantic behaviors at various levels of granularity. As will be described further infra, the regional semantics A-D can pertain to static/dynamic binding, type inference, variable definition, construct comparison, type conversion, code safety, overflow and distributed execution, among others. This example illustrates the ability of semantics to be composed in various manners to allow semantic control at any level of syntactic granularity.

First, consider semantic region A. Here, semantic region A represents a global semantic applicable to the entire program. For example, this could indicate that members are either statically or dynamically bound. Further, such a scenario can correspond to a default program semantic and/or an explicitly specified semantic.

There are two distinct regions associated with B semantics, B and B'. In one instance, region B semantics could indicate that the code segment should be dynamically bound. Accordingly, if the global semantics of region A specify static typing, this can be overridden by the semantics of region B. In the second region B', the semantics can again be overridden with respect to code with an exception for embedded region A'. In other words, global semantic behavior A can be overwritten by semantic behavior B, a portion of which was then reestablished with semantic behavior A. Accordingly, behavior can be toggled on or off for particular regions of code.

Semantic region C defines a further semantic behavior within the program in addition to the semantics of embedded region A. By way of example, this semantic can correspond to an indication that type inference is to be applied for that segment of code. Incorporated region D can override the semantics of region C or be supplemental thereto. As such, region D can correspond to disallowing type inference or indicating how a particular piece of code is to be compared (e.g., binary comparison vs. Unicode comparison). Where region D overrides the semantics of region C, the semantics can be reinstituted with per the embedded region C'.

Figure 4:
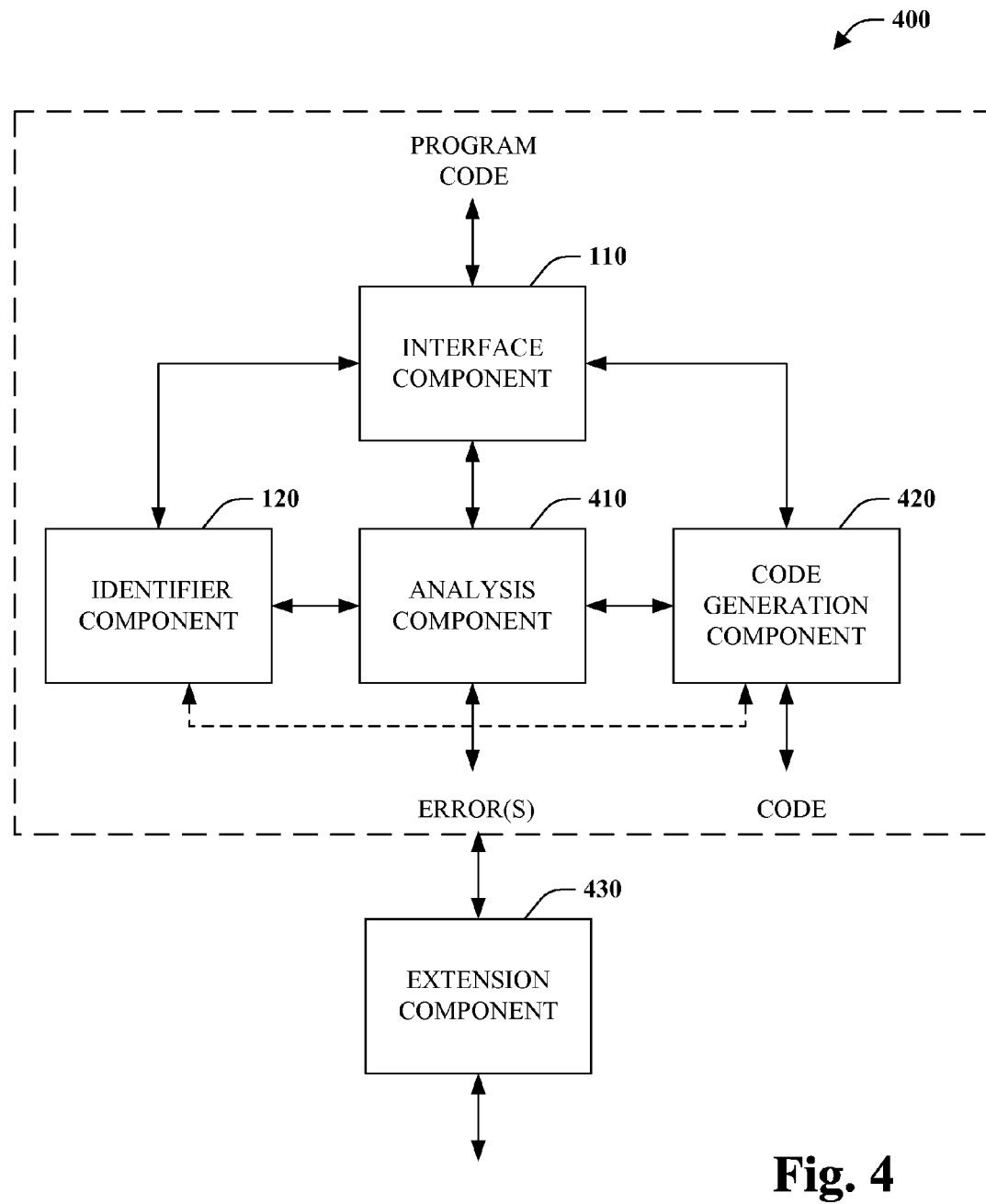
FIG. 4 illustrates a compilation system in accordance with an aspect of the claimed subject matter.

Turning to FIG. 4, a program compilation/translation system 400 is illustrated in accordance with an aspect of the claimed subject matter. The system 400 can function as a conventional compiler or language translation system with the exception that it can operate with respect to multiple semantic behaviors specified at various levels of granularity. In one instance, explicit semantic behaviors can be treated as options to be effected by the system 400. Such options can turn on or turn off semantic behavior.

Similar to system 100 of FIG. 1, the system 400 includes the interface component 110 and the identifier component 120, as previously described. In brief, the interface component 110 is operable to obtain program code and afford such a program to the identifier component 120 to facilitate identification of semantic behavior. Further provided are analysis component 410 and code generation component 420 communicatively coupled directly or indirectly to the interface component 110 and identifier component 120.

The analysis component 410 is operable to analyze program code in light of semantic behaviors or options noted by the identifier component 410. For instance, the analysis component 410 can be responsible for type checking the program code wherein the type checking can vary across syntactic regions of code. Upon successful analysis of the code, the output can be processed by the code generation component 420. Alternatively, the analysis component 410 can output programming errors and/or warnings where type checking fails, for instance.

The code generation component 420 translates the code to or generates code corresponding to input code in a target language respecting semantic behavior specified for all or a portion of the input code. For example, high-level source code supporting tunable semantics can be transformed to intermediate language (IL) code for subsequent execution by a virtual machine. The analysis component 410 and the code generation component 420 can cooperate to facilitate code generation or translation that respects specified semantics.

The program compilation/translation system 400 can also include an extension component 430. The extension component 430 provides a mechanism to extend and/or alter functionality provided by the interface component 110, identifier component 120, analysis component 410 and/or code generation component 420. While illustrated as a separate component it is to be appreciated that the extension component 430 can be incorporated into one or more of the illustrated components. In accordance with one implementation, the extension component 430 can receive, retrieve or otherwise acquire a plug-in and extend/alter default system functionality therewith. By way of example and not limitation, a plug-in can supply an alternative type inference algorithm and/or binding mechanism.

Figure 5:
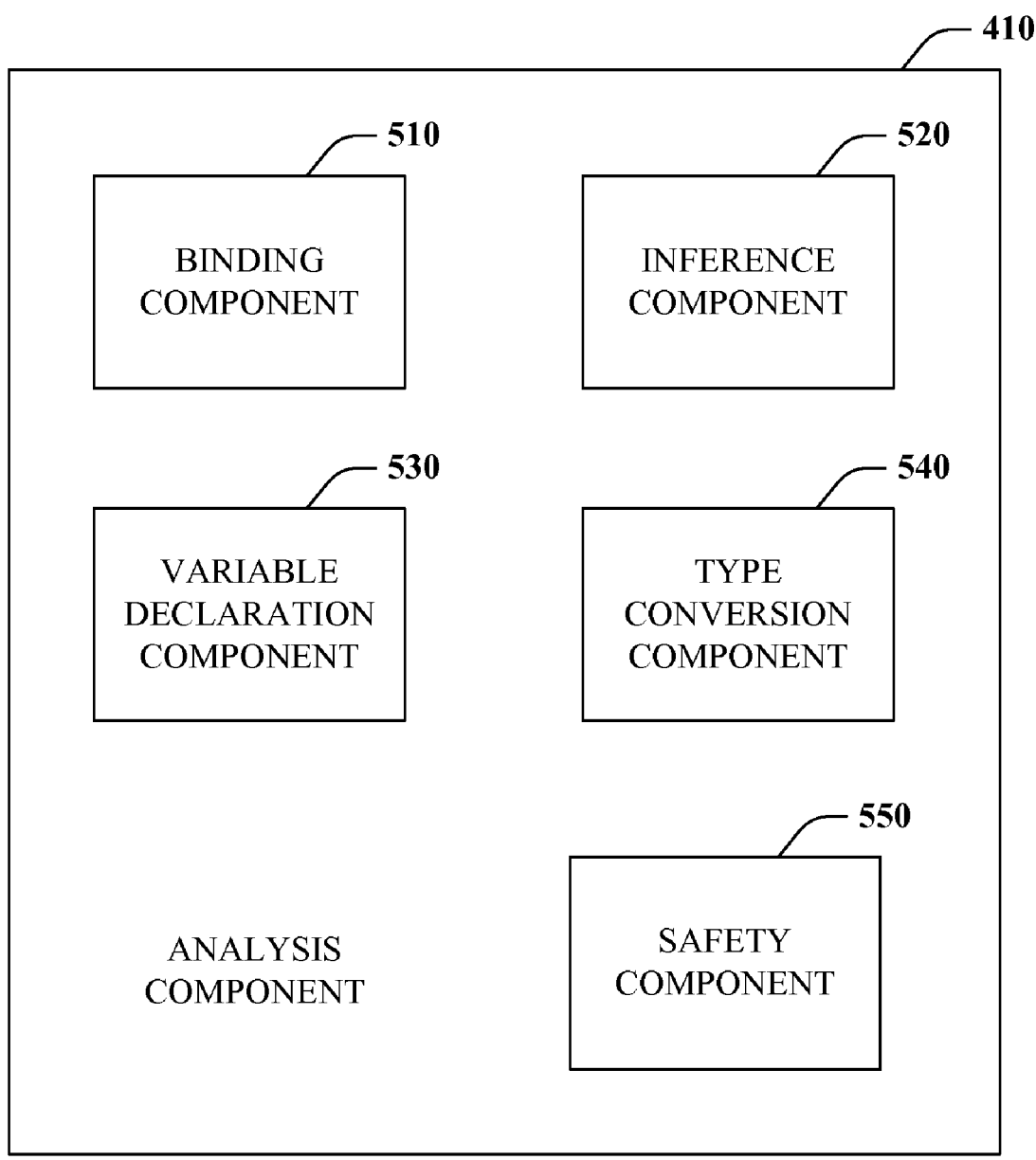
FIG. 5 is a block diagram of a representative analysis component for analyzing code with respect to various semantic options.

Referring to FIG. 5, a representative analysis component 410 is illustrated including a plurality of subcomponents associated with processing various semantic behaviors or options. Among other things, aspects of the claimed subject matter allow users to indicate domain specific semantics using a single syntax. As previously described, a program can be specified with semantic options at various levels of syntactic granularity and analysis component 410 should respect those options when analyzing code. What follows is a description of a few exemplary subcomponents that facilitate semantic program analysis in accordance with designated semantics.

One semantic option can relate to whether members are early bound or late bound. Binding component 510 is a mechanism providing functionality for binding members with types. If a region is identified as early bound, the binding component 510 can be employed to bind types to members at compile time. Regions of code noted as late bound can be ignored at compile time and later bound at runtime.

Semantic options can also indicate if type inference is applicable or not. Type inference relieves programmers of a burden of explicit specification of types in various positions if the types can otherwise be inferred from context. If the type inference semantic selected, the type inference component 520 can be employed to infer types. Otherwise, such functionality can be withheld.

Another semantic option can exist regarding specification of variables. More particularly, the option can relate to whether or not a variable needs to be declared prior to utilizing it. If this option is on for at least a segment of a program and a variable is not declared prior to use, then variable declaration component 530 can be called to generate an error. Alternatively, if it is off then the constraint would not be enforced and at least a portion of code would pass such analysis.

Another semantic can related to whether a particular type conversions are allowed such as implicit downcasts, among other things. The type conversion component 540 can be employed to analyzed designated code to ensure type conversions constraints are respected. If they are not, an error can be generated.

Type safety component 550 can be utilized to perform various safety checks to ensure type safety where designated. By way of example, if a code segment is identified as safe, type safety component 550 can be employed to check array bounds, among other things. If the code fails any safety check, an error can be generated. Alternatively, if type safety is off, pointer arithmetic, among other things, can be allowed where they would otherwise cause an error to generated.

Figure 6:
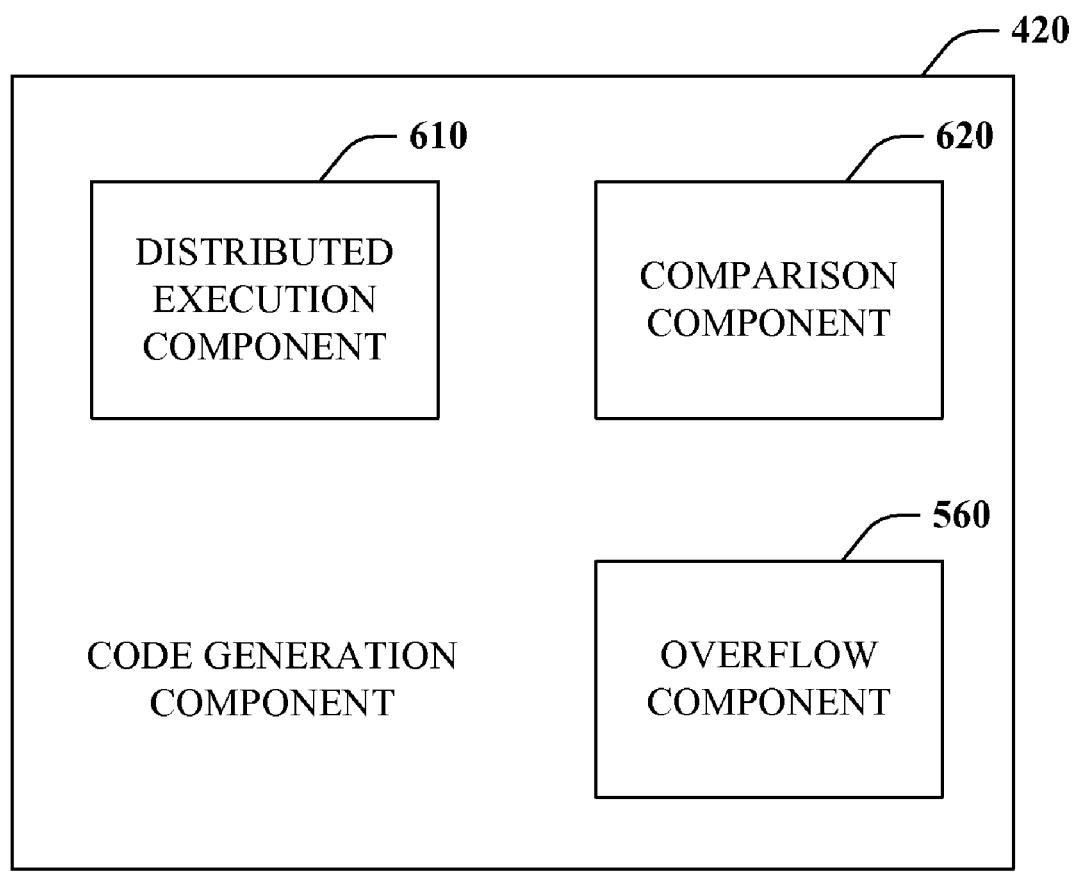
FIG. 6 is a block diagram of a representative code generation component responsive to specified semantic behaviors.

FIG. 6 depicts a representative code generation component 420 responsive to specified semantic behaviors. Similar to analysis component 410, the code generation component 420 can employ mechanisms to facilitate translation or generation of code crafted with respect to identified semantics at various levels of granularity. For purposed of clarity and understanding, a few exemplary subcomponents are provided and described.

As shown, code generation component 420 can include a distributed execution component 610. In some instances, program code can be distributed or split amongst processing mechanisms such as but not limited to client/server execution. Such execution can be explicitly specified at various levels of granularity with respect to program code. The distributed execution component 610 can facilitate generation of code that executes across execution mechanisms such as by generating code targeted for a client and server, for instance.

The code generation component 420 can also include a comparison component 620. Code constructs such as those of type string are sometimes compared with other code in a program. However, there are a number of ways to perform comparison. For example, code can be compared as a function of a Unicode representation or a binary representation. Based on an identified comparison semantic, the comparison component 620 can at least aid production of proper code therefor.

Furthermore, semantic behavior related to overflow can also be specified related to at least a portion of code. In particular, it can designate how overflow is to be handled, namely by throwing an exception upon detection of overflow or by allowing wrap around. Where selected, overflow component 630 can generate code to facilitate spawning of an error or exception upon detection of overflow.

It is to be appreciated again that the functionality described with respect to the representative analysis component 410 of FIG. 5 and the code generation component 420 of FIG. 6 is merely exemplary. There are many other semantic options or behaviors that can be employed therewith. Furthermore, code analysis and generation can be tightly coupled such that identified semantic behaviors can be captured and/or respected by one or both of the analysis component 410 and the code generation component 420.

Figure 7:
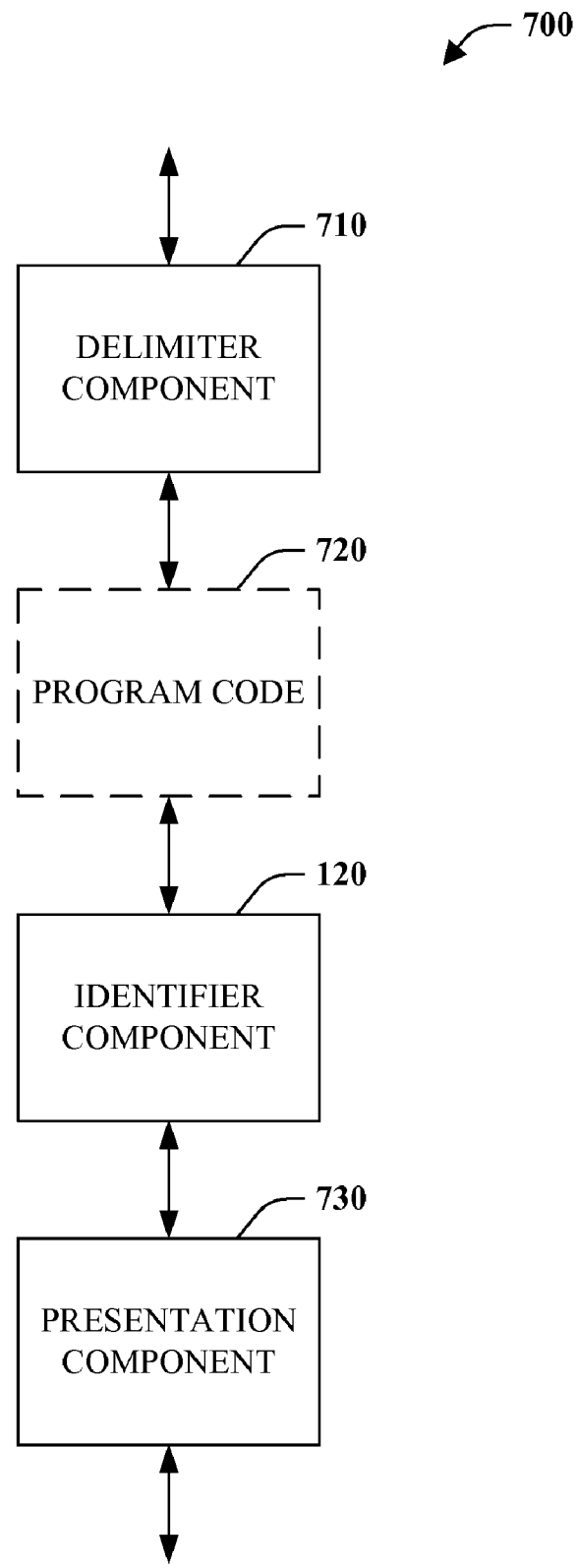
FIG. 7 is a block diagram of a program development environment.

Turning to FIG. 7, a program development system 700 is illustrated in accordance with an aspect of the claimed subject matter. In one instance, the development system 700 can be incorporated into a conventional integrated development environment (IDE) to provide extension thereto to support various semantics.

The system 700 includes a delimiter component 710 that facilitates identifying or delimiting explicit semantic scope of program code 720. Among other things, this can be captured syntactically or by utilizing interface gestures to effect other visual identification. For example, the delimiter component 710 can be employed delimit code by special characters such as the dollar sign "$" or exclamation point "!" wherein code following or bracketed by such characters is associated with one or more particular semantic behaviors. Similarly, such special characters or types can be utilized to specify semantics associated with an single member or expression such as "Object(e)" or "$e." Additionally or alternatively, the delimiter component 710 can support semantic scope identification by highlighting code via click and drag, among other things. In this case, the click and drag identification can cause the delimiter component 710 to insert delimiting syntax or other mechanisms. Furthermore, such mechanisms can be utilized to toggle options on or off.

The programming system 700 further includes the identifier component 120 and presentation component 730. The identifier component 120 alone or in conjunction with interface component 110 (not shown) can facilitate identification or discovery of explicitly specified semantic behavior at various levels of granularity within the program code 720. For example, the identifier component 120 can identify a region of code and associated semantics as a function of a delimitation mechanism (e.g., keyword, token, symbol, static type . . . ).

The presentation component 730 can employ identifier information to display semantic regions in an easily comprehendible manner. In situations where only lexical syntactic mechanisms, keywords or tokens are employed to explicitly identify semantic scope, the code can become very messy and obfuscated especially with extensive use of semantic scoping. The presentation component 730 can remedy the situation in a variety of manners such as by altering syntax coloring and/or highlighting the syntax in different colors to identify regions in which various semantic behaviors or options are set. In other words, visual clues can be provided to distinguish semantic regions. Consider the following code snippet:
Dim x as Int=12;
Dim y as String=x;
Here, an implicit narrowing conversion can be specified as allowed on the second code portion "Dim y as String=x" by highlighting the code in red, for instance. In accordance with one aspect, special syntax or keywords can be replaced or substituted by visual clues to substantially improve readability. However, the presentation component 730 can display the special syntax in combination with other mechanisms of distinguishing semantics.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the analysis component 410 and/or code generation component 420 can employ such mechanism to facilitate code analysis and generation in view of a plurality of specified semantic behaviors or options. Further, inference component 520 can utilize intelligent mechanisms and/or machine learning to infer data types.

Figure 8:
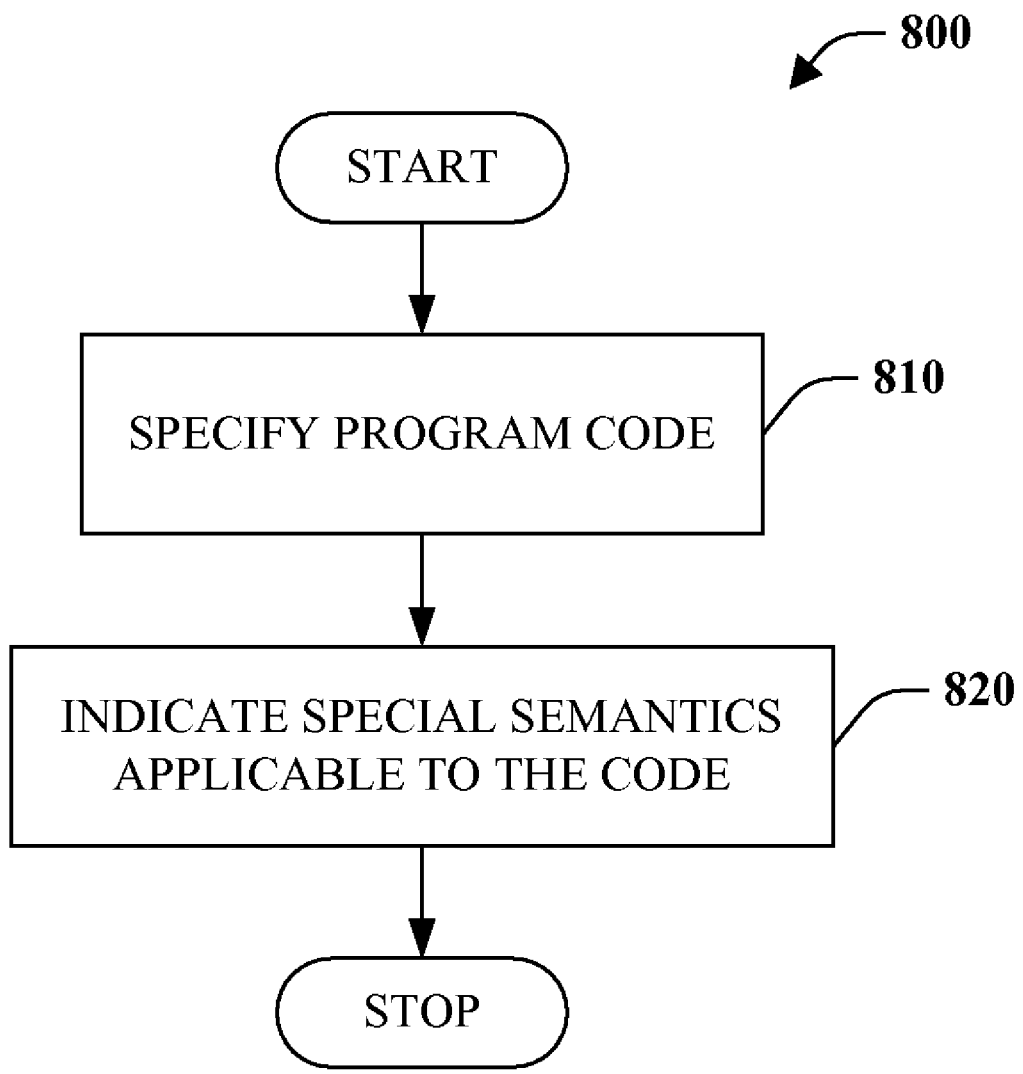
FIG. 8 is a flow chart diagram of a method of computer program development.
Figure 9:
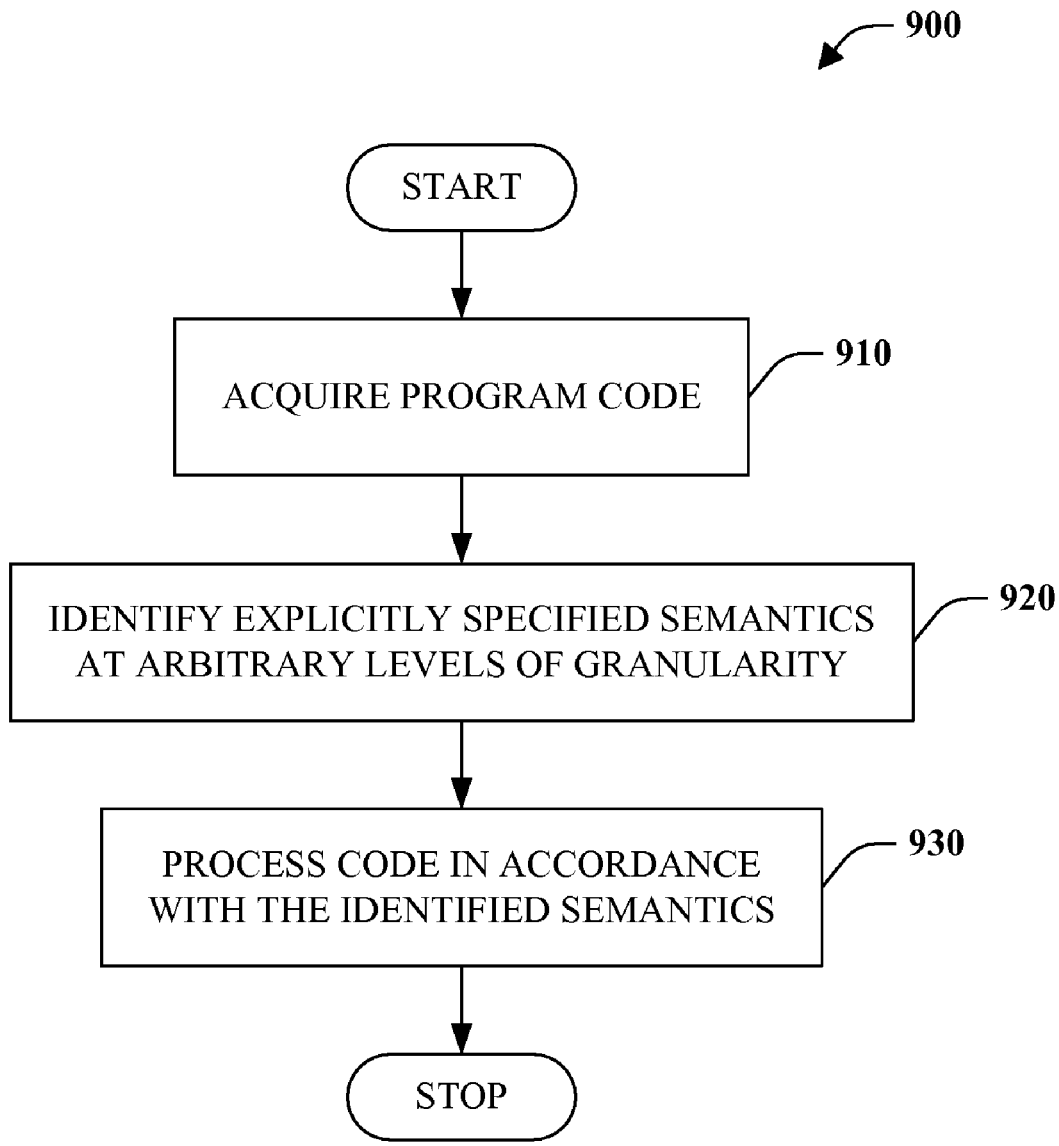
FIG. 9 is a flow chart diagram of a method of computer program processing.
Figure 10:
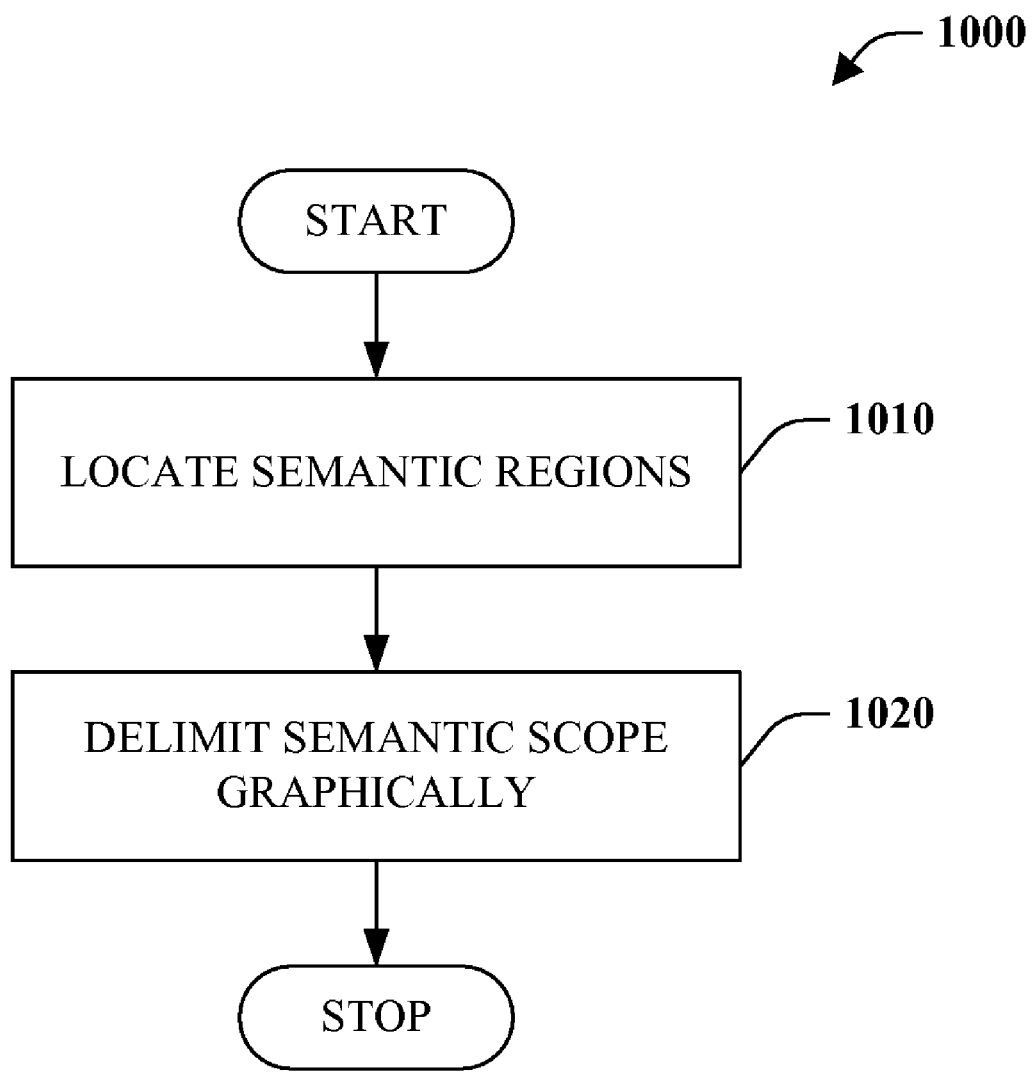
FIG. 10 is a flow chart diagram of a method of computer program interpretation.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a method of computer programming 800 is illustrated in accordance with an aspect of the claimed subject matter. At reference numeral 810, programmatic code can be specified. This can correspond to any conventional program specification task including, without limitation, defining classes/methods, instantiating objects, variable declaration, program flow definition and the like. At reference 820, special semantics associated with the code or portions thereof are indicated. By way of example and not limitation, indications can be made as to binding (e.g., early vs. late), type inference (e.g., on/off), type conversions (e.g., implicit downcast allowed/prohibited), comparison (e.g., Unicode/binary), overflow (e.g., checking on/off), program safety (e.g., safe vs. unsafe) and/or distributed execution (e.g., local vs. remote execution). Special semantics can be specified and/or delimited explicitly utilizing unique/special syntax (e.g. $, ! . . . ), types (e.g., static type, Object, Dynamic . . . ) and/or other mechanisms such as visual clues (e.g., syntactical coloring, background highlighting . . . ). More particularly, semantic behavior/options can be turned on or off for particular code segments or regions to customize program behavior. For example, in a statically typed language dynamic typing can be turned on or static typing turned off via specification of "r!m" and/or "r.m" wherein "r.m" is background highlighted.

This enables a seamless mixture of different tunable semantic behavior within the same program. Furthermore, semantics can be specified late in program development as opposed to upon program language selection (e.g., dynamic/static typed language). Moreover, programmers are able to control semantic behavior/options at any level of syntactic granularity rather than at a program level or compilation unit level, for instance.

FIG. 9 a method of computer program processing 900 is depicted in accordance with an aspect of the claimed subject matter. At reference numeral 910, a computer program is received, retrieved or otherwise acquired. In one instance, the program can correspond to source code including special/custom semantic behavior or options for all or a portion thereof. At numeral 920, explicitly specified semantics at arbitrary levels of granularity are identified. The semantics can be identified as a function of syntactic mechanisms, tokens or keywords, inter alia. At reference numeral 930, the program can be processed in accordance with the identified semantic behaviors or options. Among other things, processing can correspond to type checking and code generation as well as various sub-processes including type inference and type binding.

By way of example, a program can be dynamically or statically typed by default. However, various portions of code can be specified with opposite semantic behavior at arbitrary levels of granularity such that the default binding mechanism is overridden or toggled on/off. Where a program performs early binding by default, late binding can be triggered at a fine level of granularity utilizing receiver static type and/or a particular syntactic operator such as the exclamation point "!" or dollar sign "$." In one particular implementation, an object statically typed as "Object" utilizing an alias typed as "Object" or cast to that type via a function (e.g., "CObj(e).m( . . . , a, . . . )"), for instance, can be utilized solely to trigger dynamic binding thereof. Additionally or alternatively, a shorthand representation for triggering a late bound call other than the static type of a receiver can be used. For example, "CObject(e)" can be represented as "$(e)." At a higher-level granularity, an explicitly delimited scope in which late binding applies can be defined. In an exemplary embodiment, this can correspond to "$(e.m( . . . , a, . . . ))," where everything within parentheses with a dollar sign prefix are late bound. Here, that corresponds simply to a single expression "e.m( . . . , a, . . . ))."

Referring to FIG. 10, a method of program presentation 1000 is illustrated in accordance with an aspect of the claimed subject matter. In one instance, the method 1000 can be employed by an integrated development environment (IDE) or portions thereof (e.g., program editor). At reference numeral 1010, semantic regions are located. Such regions can be of any syntactic granularity including expressions, members, types, files, and/or compilation units among others. At numeral 1020, semantic scope is delimited graphically.

It is to be appreciated that a significant number of identified semantic regions at various levels of granularity can obfuscate code logic, for example, consider a plurality of embedded regions such as "( . . . $($( . . . ))$( . . . ) . . . )))." Accordingly, one or more graphic/presentation mechanisms can be employed alone or in conjunction with syntactic delimiters for purposes of clarification. There are various ways in which semantic regions can be delimited graphically including, without limitation, syntactic color, background highlighting, font, size, italics and bold. Any, all, or a combination of such mechanisms can be employed to facilitate easy identification of semantic options. While syntactic delimiters can remain, in accordance with one aspect, these identifiers can be removed and replaced with graphical delimiters to further simply code.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
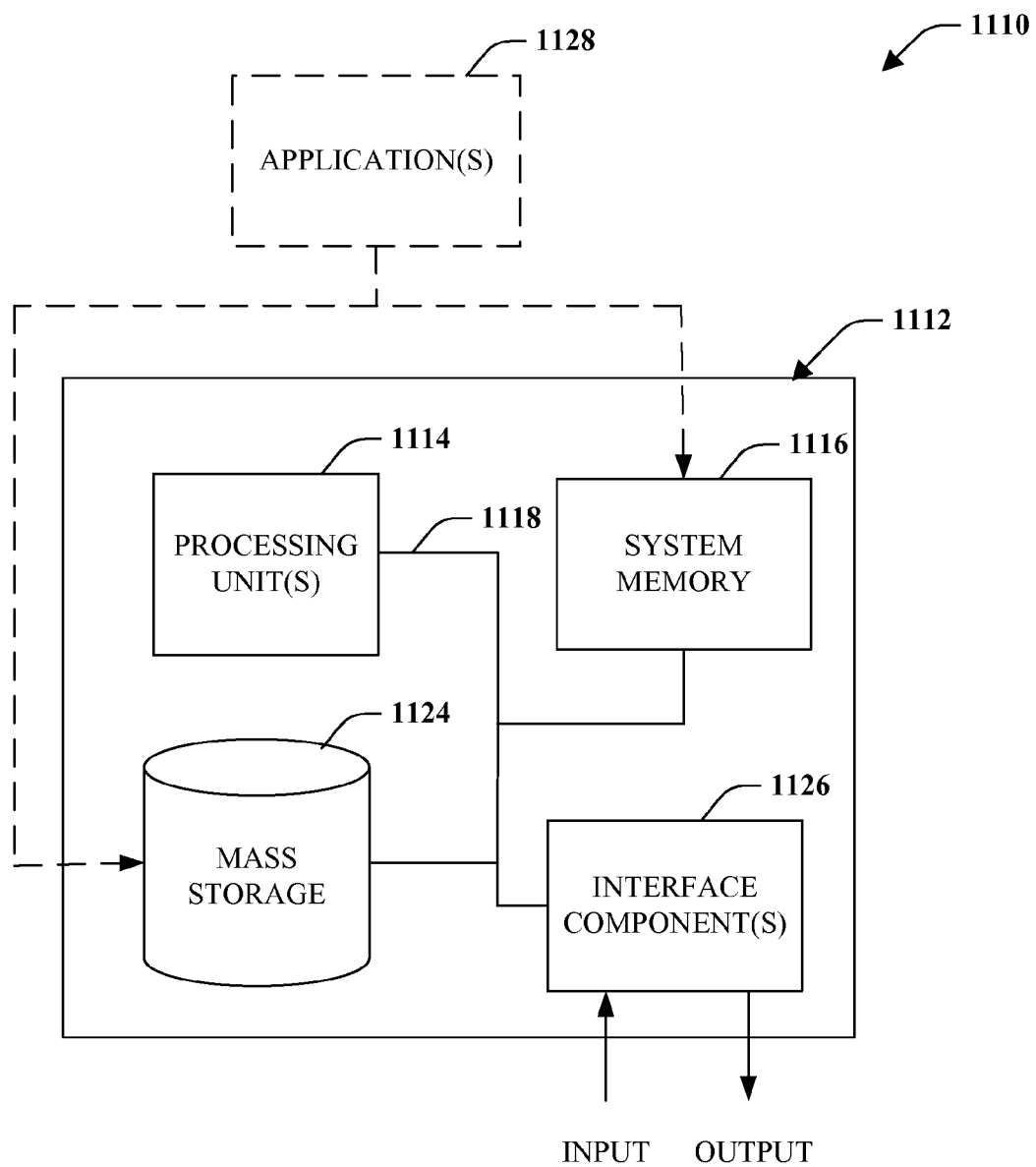
FIG. 11 is a schematic block diagram illustrating a suitable operating environment for aspects of the subject disclosure.
Figure 12:
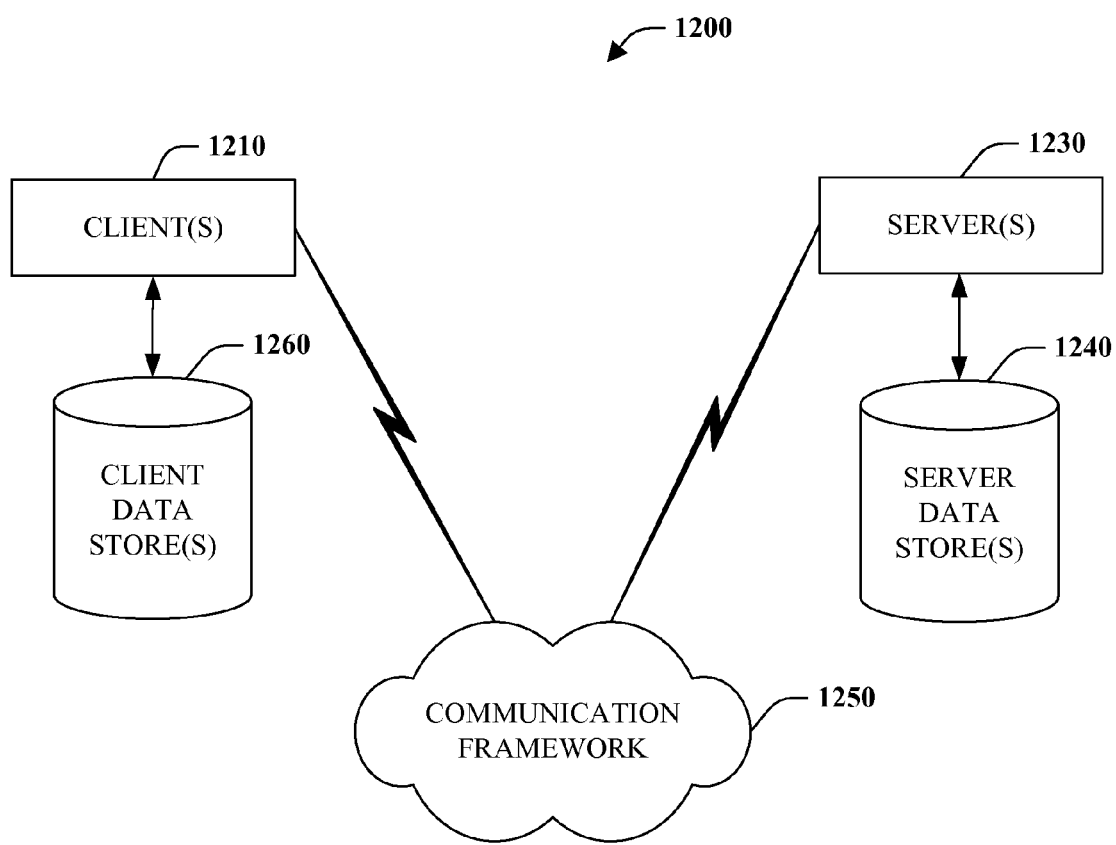
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230. For example, semantically tunable programs can be developed and housed on either or both of client(s) 1210 and server(s) 1230 and client data store(s) 1260 and server data store(s) 1240, respectively. Further, such a program can be compiled on one machine and transmitted across the communication framework 1250 for execution on one or more client(s) 1210 and server(s) 1230. Still further yet, all or a portion of the above systems and methods can be made available for download from a server 1230 to client(s) 1210, for example, as extensions to current systems such as integrated development environments (IDEs).

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. At a computer system comprising at least one processor operatively coupled to a system memory, a method for combining a mixture of semantic behaviors across a single computer program source code, the method comprising:

an act of a computer system, which includes at least one processor, acquiring computer program source code;

an act of the computer system receiving a first user interface gesture explicitly specifying a first region of the computer program source code that is to be statically bound;

an act of the computer system visually and syntactically indicating that the first region of the computer program source code is to be statically bound by inserting a first syntactical identifier into the computer program source code that syntactically delimits the first region of the computer program source code;

an act of the computer system receiving a second user interface gesture explicitly specifying a second region of the computer program source code that is hierarchically nested within the first region and that is to override a semantic behavior of the first region by being late bound;

an act of the computer system visually and syntactically indicating that the second region of the computer program source code is to be late bound by inserting a second syntactical identifier into the computer program source code that syntactically delimits the second region of the computer program source code;

an act of the computer system processing the computer program source code, including:
the computer system identifying that at least a portion of the first region of the computer program source code is to be statically bound based on the first syntactical identifier;
the computer system identifying that the second region of the computer program source code is to be late bound based on the second syntactical identifier;
the computer system applying static binding to the portion of the first region of the computer program source code and applying late binding to the second region of the computer program source code; and
the computer system transforming the computer program source code into a target language.

2. The method as recited in claim 1, wherein one or more of the first or second regions of the computer program source code corresponds to an expression, a statement, a member, a type, or a compilations unit.

3. The method as recited in claim 1, wherein the first syntactical identifier includes the dot operator ".", and wherein the second syntactical identifier includes the exclamation mark "!" operator.

4. The method as recited in claim 1, further comprising:
an act of the computer system receiving a third user interface gesture explicitly specifying a third region of the computer program source code this is to be associated with one or more of:
a semantic behavior that specifies whether a type inference is applicable or not applicable to the corresponding first or second semantic region;
a semantic behavior that specifies whether or not a variable needs to be declared prior to utilization of the variable within the corresponding first or second semantic region;
a semantic behavior that specifies whether a particular type conversion is allowed or disallowed within the corresponding first or second semantic region; or
a semantic behavior that specifies type safety for the corresponding first or second semantic region,
the method further comprising:
resolving proper semantics for the third region of the computer program source code using rules that define a hierarchy of semantic behaviors which can be used to identify an appropriate semantic behavior for the third region of the computer program source code.

5. The method as recited in claim 1, wherein designating the first region as static bound causes types to be bound to members identified in code of the first region during compile time and wherein designating the second region as late bound causes code in the second region to be unbound at compile time.

6. The method as recited in claim 4, wherein the third region of the computer program source code is associated with type inference, such that the method further comprises:
inferring a type of code within the third region of the computer program source code.

7. The method as recited in claim 4, wherein the third region of the computer program source code requires variable declaration, such that the method further comprises:
generating an error when a variable is not declared prior to use within the third region of the computer program source code.

8. The method as recited in claim 4, wherein the third region of the computer program source code is associated with particular type conversion restraints, such that the method further comprises:
generating an error when type conversion constraints are violated within the third region of the computer program source code.

9. The method as recited in claim 8, wherein the particular type conversion restraints specifies whether implicit downcasts are permitted or not permitted.

10. The method as recited in claim 4, wherein the third region of the computer program source code is associated with type safety, such that the method further comprises:
generating an error when type safety is violated within the third region of the computer program source code.

11. The method as recited in claim 1, wherein transforming the computer program source code into the target language comprises transforming the computer program source code into target language code that is optimized for distributed execution.

12. A computer system, comprising:
at least one processor operatively coupled to a system memory, and
one or more computer storage media having stored thereon computer executable instructions that, when executed by the one or more processors, implement a method for combining a mixture of semantic behaviors across a single computer program source code, the method comprising:
an act of the computer system acquiring computer program source code;
an act of the computer system receiving and identifying a first syntactical identifier that is provided by a user to explicitly specify a first region of the computer program source code that is to be statically bound;
an act of the computer system graphically indicating that the first region of the computer program source code is to be statically bound, in response to the first syntactical identifier, by graphically using a first combination of one or more fonts, font sizes, italics, or font bolding;
an act of the computer system receiving and identifying a second syntactical identifier that that is provided by a user to explicitly specifies a second region of the computer program source code that is hierarchically nested within the first region and that is to override a semantic behavior of the first region by being late bound;

an act of the computer system graphically indicating that the second region of the computer program source code is to be late bound, in response to the first syntactical identifier, by graphically using a second combination of one or more fonts, font sizes, italics, or font bolding;

an act of the computer system processing the computer program source code, including:

the computer system identifying that at least a portion of the first region of the computer program source code is to be statically bound based on the first syntactical identifier;

the computer system identifying that the second region of the computer program source code is to be late bound based on the second syntactical identifier;

the computer system applying static binding to the portion of the first region of the computer program source code and applying late binding to the second region of the computer program source code; and the computer system transforming the computer program source code into a target.

13. A computer storage medium having stored thereon computer executable instructions that, when executed by at least one processor of a computer system, implement a method for combining a mixture of semantic behaviors across a single computer program source code, the method comprising:

an act of a computer system, which includes at least one processor, acquiring computer program source code;

an act of the computer system identifying a first syntactical delimiter provided by a user that explicitly delimits a first region of the computer program source code that is to be statically bound;

an act of the computer system graphically indicating that the first region of the computer program source code is to be statically bound using a first combination of one or more of color or font, while withholding the first syntactical delimiter from a user's view;

an act of the computer system identifying a second syntactical delimiter provided by the user that explicitly delimits a second region of the computer program source code that is hierarchically nested within the first region and that is to override a semantic behavior of the first region by being late bound;

an act of the computer system graphically indicating that the second region of the computer program source code is to be late bound using a second combination of one or more of color or font, while withholding the second syntactical delimiter from the user's view;

an act of the computer system processing the computer program source code, including:

the computer system identifying that at least a portion of the first region of the computer program source code is to be statically bound based on the first syntactical delimiter;

the computer system identifying that the second region of the computer program source code is to be late bound based on the second syntactical delimiter;

the computer system applying static binding to the portion of the first region of the computer program source code and applying late binding to the second region of the computer program source code; and the computer system transforming the computer program source code into a target language.

14. The computer system of claim 1, wherein visually indicating that the first region of the computer program source code is to be statically bound comprises using a first combination of one or more colors, background highlighting, fonts, font sizes, italics, or bolding, and wherein visually indicating that the second region of the computer program source code is to be late bound comprises using a second combination of one or more colors, background highlighting, fonts, font sizes, italics, or bolding.

15. The computer system of claim 1, wherein the first user interface gesture and the second user interface gesture comprises highlighting the first region and the second region via a click and drag.

16. The computer system of claim 1, wherein the first syntactical identifier comprises a dollar sign "$" or an exclamation point "!", followed by bracketed code corresponding to the first region.

* * * * *